(12) United States Patent
Yan et al.

(10) Patent No.: US 12,119,969 B2
(45) Date of Patent: Oct. 15, 2024

(54) NON-ANCHOR CARRIER FREQUENCY OFFSET INDICATION

(71) Applicant: Lenovo (Beijing) Limited, Beijing (CN)

(72) Inventors: Zhi Yan, Beijing (CN); Xiaodong Yu, Beijing (CN); Haipeng Lei, Beijing (CN); Chenxi Zhu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 50 days.

(21) Appl. No.: 16/959,956

(22) PCT Filed: Jan. 3, 2018

(86) PCT No.: PCT/CN2018/070111
§ 371 (c)(1),
(2) Date: Jul. 2, 2020

(87) PCT Pub. No.: WO2019/134074
PCT Pub. Date: Jul. 11, 2019

(65) Prior Publication Data
US 2021/0067282 A1    Mar. 4, 2021

(51) Int. Cl.
  *H04L 27/26*  (2006.01)
  *H04L 5/00*  (2006.01)
  *H04W 48/10*  (2009.01)
  *H04W 72/0453*  (2023.01)
  *H04W 72/23*  (2023.01)

(52) U.S. Cl.
  CPC ......... *H04L 27/2602* (2013.01); *H04L 5/001* (2013.01); *H04W 48/10* (2013.01); *H04W 72/0453* (2013.01); *H04W 72/23* (2023.01)

(58) Field of Classification Search
  CPC ... H04W 48/08; H04W 48/10; H04W 72/042; H04W 72/0453; H04L 27/2602–26035
  See application file for complete search history.

(56) References Cited

U.S. PATENT DOCUMENTS 10,772,089 B2 * 9/2020 Xiao ................... H04W 72/044
2010/0272017 A1 10/2010 Terry et al.
(Continued)

FOREIGN PATENT DOCUMENTS

CN    107294681 A    10/2017
CN    107371240 A    11/2017
(Continued)

OTHER PUBLICATIONS

PCT/CN2018/070111, "International Search Report and the Written Opinion of the International Search Authority" ISA/CN, State Intellectual Property Office of the P.R. China, Sep. 11, 2018, pp. 1-6.
(Continued)

Primary Examiner — Kevin C. Harper
(74) Attorney, Agent, or Firm — Kunzler Bean & Adamson (57) ABSTRACT

Methods and apparatuses for indicating a frequency offset of a non-anchor carrier are disclosed. A method comprising: transmitting a broadcast signal on an anchor carrier and transmitting system information on a non-anchor carrier, wherein the broadcast signal includes a frequency offset of the non-anchor carrier to the anchor carrier.

20 Claims, 6 Drawing Sheets

(56) References Cited

U.S. PATENT DOCUMENTS

| | | | |
|---|---|---|---|
| 2011/0261772 A1* | 10/2011 | Iwamura | H04W 28/20 |
| | | | 370/329 |
| 2017/0238292 A1 | 8/2017 | Alvarino et al. | |
| 2017/0289965 A1 | 10/2017 | You et al. | |
| 2019/0150068 A1* | 5/2019 | Montojo | H04L 5/0046 |
| | | | 370/329 |
| 2019/0253231 A1* | 8/2019 | Park | H04L 5/1469 |
| 2019/0349938 A1* | 11/2019 | Chen | H04W 64/00 |
| 2020/0163032 A1* | 5/2020 | Su | H04L 5/001 |
| 2021/0099944 A1* | 4/2021 | Hoglund | H04L 5/0005 |

FOREIGN PATENT DOCUMENTS

| | | | | |
|---|---|---|---|---|
| EP | 3522433 A1 | 8/2019 | | |
| EP | 3610676 A1 | 2/2020 | | |
| WO | WO-2017136000 A1 * | 8/2017 | | H04L 1/0041 |
| WO | 2019096431 A1 | 5/2019 | | |

OTHER PUBLICATIONS

Samsung, Discussion on DL common channel/signal for TDD NB-IoT, 3GPP TSG RAN WG1 Meeting #91, R1-1720266, Nov. 27-Dec. 1, 2017, pp. 1-6, Reno, USA.

Qualcomm Incorporated, Downlink aspects of TDD, 3GPP TSG-RAN WG1 #91, R1-1720428, Nov. 27-Dec. 1, 2017, pp. 1-4, Reno, USA.

* cited by examiner

NON-ANCHOR CARRIER FREQUENCY OFFSET INDICATION

FIELD

The subject matter disclosed herein generally relates to wireless communications, and more particularly relates to indicating a frequency offset of a non-anchor carrier.

BACKGROUND

The following abbreviations are herewith defined, at least some of which are referred to within the following description: Third Generation Partnership Project ("3GPP"), Downlink ("DL"), Evolved Node B ("eNB"), European Telecommunications Standards Institute ("ETSI"), Frequency Division Duplex ("FDD"), Frequency Division Multiple Access ("FDMA"), Internet-of-Things ("IoT"), Narrowband Internet-of-Things ("NB-IoT" or "NBIoT"), Long Term Evolution. ("LTE"), Multiple Access ("MA"), Narrowband ("NB"), Narrowband Physical Downlink Shared Channel ("NPDSCH" or "NB-PDSH"), Narrowband Physical Broadcast Channel ("NPBCH" or "NB-PBCH"), Narrowband Physical Downlink Control Channel ("NPDCCH", or "NB-PDCCH"), Next Generation Node B ("gNB"), Narrowband Primary Synchronization Signal ("NPSS"), Narrowband Secondary Synchronization Signal ("NSSS"), Orthogonal Frequency Division Multiplexing ("OFDM"), Physical Resource Block ("PRB"), Radio Resource Control ("RRC"), Reference Signal ("RS"), Single Carrier Frequency Division Multiple Access ("SC-FDMA"), System Information ("SI"), System Information Block ("SIB"), System Information Block Type1-NB ("NB-SIB1"), Time-Division Duplex ("TDD"), Time Division Multiplex ("TDM"), User Entity/Equipment (Mobile Terminal) ("UE"), Uplink ("UL"), Universal Mobile Telecommunications System ("UMTS"), and Worldwide Interoperability for Microwave Access ("WiMAX").

A downlink narrowband physical channel corresponds to a set of resource elements carrying information originating from higher layers. The following downlink physical channels are defined:

Narrowband Physical Downlink Shared Channel, NPDSCH;

Narrowband Physical Broadcast Channel, NPBCH; and

Narrowband Physical Downlink Control Channel, NPDCCH.

The transmitted signal on one antenna port in each slot is described by a resource grid of size one resource block. Only $\Delta f=15$ kHz is supported.

For NPDSCH carrying SystemInformationBlockType1-NB (NB-SIB1) and SI-messages, the UE shall decode NPDSCH according to the transmission scheme: "if the number of NPBCH antenna ports is one, Single-antenna port, port 0 is used, otherwise Transmit diversity".

For NB-IoT (Narrowband Internet-of-Things) TDD downlink, NPSS/NSSS/NB-PBCH are transmitted on the anchor carrier.

NPSS is transmitted on subframe #5 in every radio frame.

NSSS is transmitted on subframe #0 in every even-numbered radio frame.

NB-PBCH is in subframe 9 in every radio frame on the same carrier as NPSS/NSSS.

Due to the limited downlink resource for TDD of NB-IoT, NB-SIB1 cannot always be transmitted on an anchor carrier.

BRIEF SUMMARY

Methods and apparatuses for indicating a frequency offset of a non-anchor carrier are disclosed.

In one embodiment, a method comprising: transmitting a broadcast signal on an anchor carrier and transmitting a system information on a non-anchor carrier, wherein the broadcast signal includes a frequency offset of the non-anchor carrier to the anchor carrier.

In one embodiment, the frequency offset of the non-anchor carrier to the anchor carrier includes an information of the non-anchor carrier having a higher or lower frequency than the anchor carrier and an absolute frequency offset value of the non-anchor carrier to the anchor carrier or some combination thereof.

In another embodiment, the frequency offset of the non-anchor carrier to the anchor carrier includes a relative frequency offset of the non-anchor carrier to the anchor carrier. The relative frequency offset of the non-anchor carrier to the anchor carrier may be symmetrical to zero.

In some embodiment, the anchor carrier is in a guard band frequency of a LTE carrier, and the broadcast signal further includes bandwidth information of the LTE carrier. The broadcast signal may further include a frequency offset of the anchor carrier to the LTE carrier. The frequency offset of the non-anchor carrier to the anchor carrier may depend on the bandwidth information of the LTE carrier.

In some embodiment, the non-anchor carrier is adjacent to the anchor carrier.

In one embodiment, an apparatus comprising: a transmitter that transmits a broadcast signal on an anchor carrier and transmits system information on a non-anchor carrier, wherein the broadcast signal includes a frequency offset of the non-anchor carrier to the anchor carrier.

In another embodiment, a method comprising: receiving a broadcast signal on an anchor carrier and receiving a system information on a non-anchor carrier, wherein the broadcast signal includes a frequency offset of the non-anchor carrier to the anchor carrier.

In yet another embodiment, an apparatus comprising: a receiver that receives a broadcast signal on an anchor carrier and receives system information on a non-anchor carrier, wherein the broadcast signal includes a frequency offset of the non-anchor carrier to the anchor carrier.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory ("RAM"), read-only memory ("ROM"), erasable programmable read-only memory ("EPROM" or "Flash Memory"), portable compact disc read-only memory ("CD-ROM"), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The description of elements in each figure may refer to elements of proceeding figures. Like numbers refer to like elements in all figures, including alternate embodiments of like elements.

Figure 1:
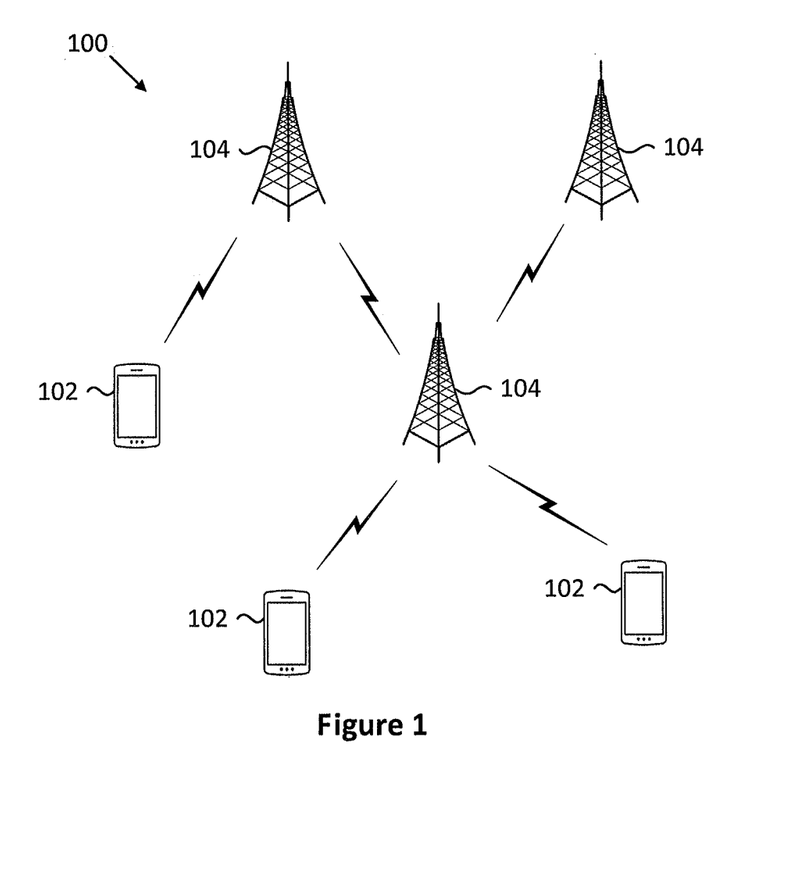
FIG. 1 is a schematic block diagram illustrating one embodiment of a wireless communication system for indicating the offset of the non-anchor carrier.

FIG. 1 depicts an embodiment of a wireless communication system 100 for indicating the frequency offset of the non-anchor carrier. In one embodiment, the wireless communication system 100 includes remote units 102 and base units 104. Even though a specific number of remote units 102 and base units 104 are depicted in FIG. 1, one skilled in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, UE, user terminals, a device, or by other terminology used in the art. Moreover, the remote units 102 may be a terminal of an IoT (Internet-of-Things). The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In various embodiments, a base unit 104 may transmit a broadcast signal on an anchor carrier and transmit system information on a non-anchor carrier, wherein the broadcast signal includes a frequency offset of the non-anchor carrier to the anchor carrier.

In certain embodiments, a remote unit 102 may receive the broadcast signal on the anchor carrier and receive the system information on the non-anchor carrier.

Figure 2:
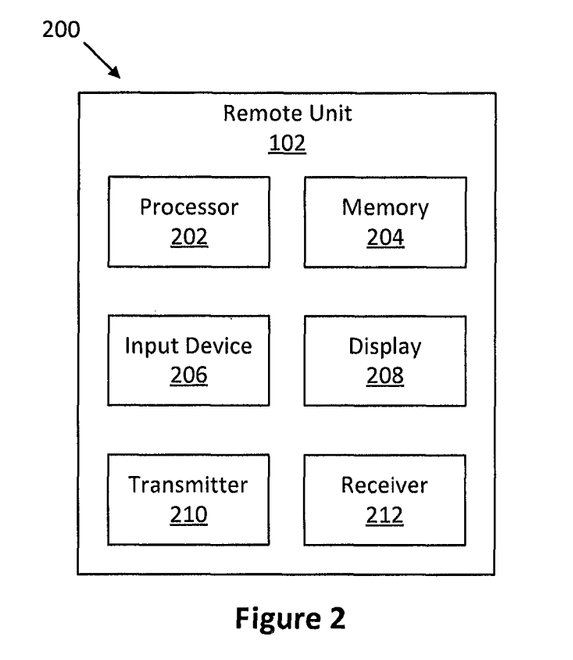
FIG. 2 is a schematic block diagram illustrating one embodiment of an apparatus that may be used for indicating the offset of the non-anchor carrier.

FIG. 2 depicts one embodiment of an apparatus 200 that may be used for receiving the broadcast signal and the system information. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the receiver 212 may be used to receive the broadcast signal one the anchor carrier and the system information on the non-anchor carrier, wherein the broadcast signal includes a frequency offset of the non-anchor carrier to the anchor carrier. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
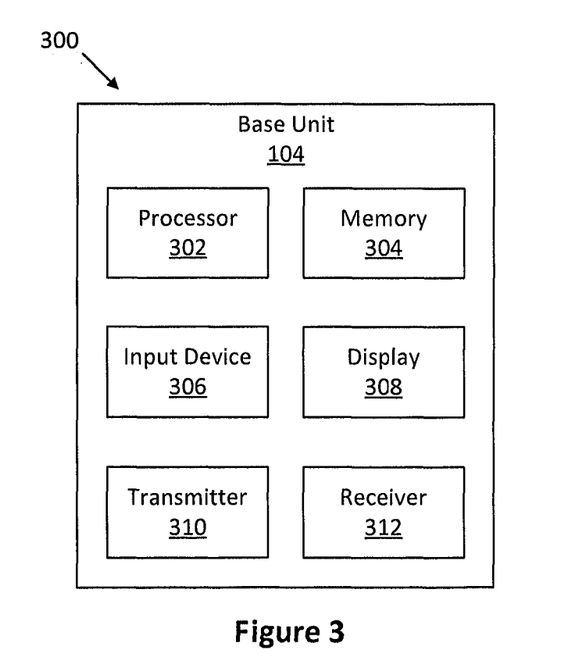
FIG. 3 is a schematic block diagram illustrating one embodiment of an apparatus that may be used for indicating the offset of the non-anchor carrier.

FIG. 3 depicts one embodiment of an apparatus 300 that may be used for indicating a frequency offset of the non-anchor carrier. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit a broadcast signal on an anchor carrier and transmit a system information on a non-anchor carrier, wherein the broadcast signal includes a frequency offset of the non-anchor carrier to the anchor carrier. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
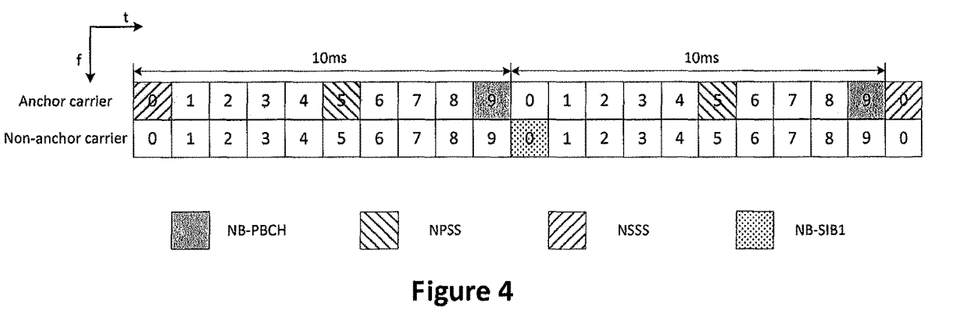
FIG. 4 is a schematic diagram illustrating NB-IoT DL frame structure.

FIG. 4 depicts that the system information NB-SIB1 can be transmitted in non-anchor carriers. As shown in FIG. 4, the NB-PBCH is transmitted on subframe #9 in every radio frame of the anchor carrier; the NPSS is transmitted on subframe #5 in every radio frame of the anchor carrier; the NSSS is transmitted on subframe #0 in every even-numbered radio frame. On the other hand, due to the limited downlink resource for TDD, the NB-SIB1, which is a system information, cannot be always transmitted on the anchor carrier. As shown in FIG. 4, the NB-SIB1 may be transmitted on a non-anchor carrier.

The anchor carrier is the carrier carrying at least synchronization signal and broadcast signal. The remote unit is always able to identify the anchor carrier and receive signals transmitted on the anchor carrier. However, the frequency offset of the non-anchor carrier is necessary to be indicated so that the remote unit knows the frequency of the non-anchor carrier in order to obtain the system information NB-SIB1.

The NB-SIB1 can be transmitted either in the anchor carrier or the non-anchor carrier. Whether the NB-SIB1 is transmitted on the anchor carrier or the non-anchor carrier is indicated by a NB-MIB. The NB-MIB is a broadcast signal transmitted on the anchor carrier.

The remote unit, upon receiving the broadcast signal transmitted on the anchor carrier, extracts the NB-MIB in order to know the frequency offset of the non-anchor carrier on which the NB-SIB1 is transmitted.

Three operation modes are supported for TDD NB-IoT: standalone, guard band and in-band. In the in-band operation mode, a resource block in a LTE carrier is used as the carrier. In the guard band operation mode, the resource blocks that are not used in the edge protection bands of the LTE are used as the carrier. In the standalone operation mode, a refarming GSM band with a width of 200 KHz is always used as the carrier.

In different operation modes, the indications of the frequency offset of the non-anchor carrier in the NB-MIB are different.

Figure 5:
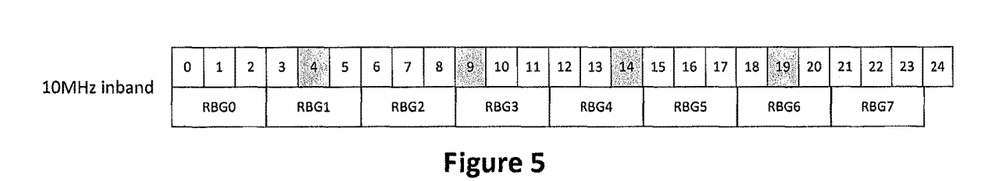
FIG. 5 is a schematic diagram illustrating one embodiment of non-anchor carrier frequency offset indication in an in-band operation mode.

FIG. 5 depicts one embodiment of non-anchor carrier frequency offset indication in the in-band operation mode. In the in-band operation mode, one PRB in LTE carrier is configured as the anchor carrier. The other PRBs in LTE carrier may be configured as the non-anchor carriers. Preferably, the adjacent PRBs of the PRB which is the anchor carrier are configured as the non-anchor carrier. As depicted in FIG. 5, for in a 10 MHz LTE systems, if PRB #9 is configured as a NBIoT anchor carrier, PRB #8 or PRB #10 may be configured as the non-anchor carrier. Preferably, the resource block group (RBG) in legacy LTE is not fragmented. In the example of FIG. 5, if PRB #9 is configured as the anchor carrier, it is better to configure the non-anchor carrier in PRB #10 instead of PRB #8. As another example, if PRB #14 is configured as the anchor carrier, it is better to configure the non-anchor carrier in PRB #13 instead of PRB #15.

To indicate whether the lower frequency carrier (PRB) or the higher frequency carrier (PRB) is configured as the non-anchor carrier, one bit is necessary to be included in the NB-MIB. In addition, another bit is preferably included in the NB-MIB to distinguish whether the carrier for transmitting the NB-SIB1 is the anchor carrier or the non-anchor carrier.

Table 1 provides a detailed solution:

TABLE 1

| non-anchor carrier indication for in-band operation mode ||| 
|---|---|---|
| Indication in MIB | Carrier | Subframe |
| 00 | anchor | 0 |
| 01 | anchor | 4 |
| 10 | Non-anchor (higher adjacent frequency band) Or 180 KHz carrier center offset to the anchor carrier center | 0 (PCell %2 = 0) 5 (PCell %2 = 1) |
| 11 | Non-anchor (lower adjacent frequency band) Or −180 KHz carrier center offset to the anchor carrier center | 0 (PCell %2 = 0) 5 (PCell %2 = 1) |

"00" means that the NB-SIB1 is transmitted in subframe #0 of the anchor carrier. "01" means that the NB-SIB1 is transmitted in subframe #4 of the anchor carrier. "10" means that the NB-SIB1 is transmitted in subframe #0 (in the condition that the cell ID is even) or subframe #5 (in the condition that the cell ID is odd) of the non-anchor carrier. The non-anchor carrier is 180 KHz higher than the anchor carrier (the non-anchor carrier is the adjacent higher PRB in LTE to PRB which is the anchor carrier), i.e. the center frequency of the non-anchor carrier—the center frequency of the anchor carrier=180 KHz. "11" means that the NB-SIB1 is transmitted in subframe #0 (in the condition that the cell ID is even) or subframe #5 (in the condition that the cell ID is odd) of the non-anchor carrier. The non-anchor carrier is 180 KHz lower than the anchor carrier (the non-anchor carrier is the adjacent lower PRB in LTE to PRB which is the anchor carrier), i.e. the center frequency of the anchor carrier—the center frequency of the non-anchor carrier=180 KHz.

In summary, a total of two (2) bits are necessary in the NB-MIB to indicate (1) whether the NB-SIB1 is transmitted on the anchor carrier or the non-anchor carrier and (2) the non-anchor carrier is higher or lower than the anchor carrier, i.e. there is a frequency offset X between the non-anchor carrier and the anchor carrier, wherein the frequency offset X is a predefined, fixed, or pre-configured positive value.

Figure 6:
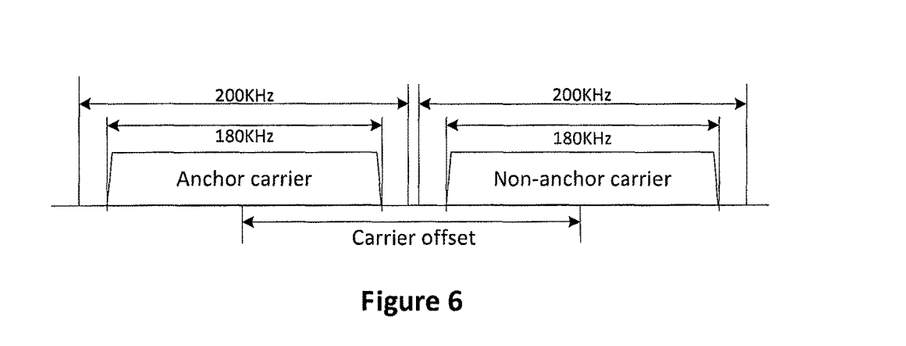
FIG. 6 is a schematic diagram illustrating one embodiment of non-anchor carrier frequency offset indication in a standalone operation mode.

FIG. 6 depicts one embodiment of the non-anchor carrier frequency offset indication in the standalone operation mode.

As depicted in FIG. 6, in the standalone operation mode, the channel band width is 200 KHz. Therefore, each of the anchor and non-anchor carriers is within the channel band. In the standalone operation mode, the anchor and non-anchor carriers are not adjacent PRBs with 180 KHz.

In the standalone operation mode, the anchor carrier should meet the 100 KHz channel raster requirement. On the other hand, there is no 100 KHz channel raster requirement for non-anchor carriers. Therefore, in addition to a first bit for indicating whether the carrier is the anchor carrier or the non-anchor carrier and a second bit for indicating whether a lower frequency carrier or a higher frequency carrier is configured as the non-anchor carrier, additional bits (for example, two bits) are necessary to indicate an absolute frequency offset of the non-anchor carrier to the anchor carrier. The absolute frequency offset should be positive. The absolute frequency offset may be calculated by an absolute number of subcarriers (15 KHz) from the center of non-anchor carrier to the center of the anchor carrier, or by an absolute number of PRBs (180 KHz) from the center of the non-anchor carrier to the center of the anchor carrier.

Tables 2 and 3 provide a detailed solution:

TABLE 2 non-anchor carrier indication for standalone operation mode

| Indication in MIB | Carrier | Subframe |
|---|---|---|
| 00 | anchor | 0 |
| 01 | anchor | 4 |
| 10 | Non-anchor (X higher frequency band) | 0 (PCell %2 = 0) 5 (PCell %2 = 1) |
| 11 | Non-anchor (X lower frequency band) | 0 (PCell %2 = 0) 5 (PCell %2 = 1) |

TABLE 3 carrier offset of the non-anchor carrier for standalone operation mode

| Extra Indication in MIB | X carrier offset to anchor carrier |
|---|---|
| 00 | 12 subcarriers |
| 01 | 13 subcarriers |
| 10 | 24 subcarriers |
| 11 | reserved |

To be compatible with the in-band operation mode, Table 2 is substantially the same as Table 1. "00" means that the NB-SIB1 is transmitted in subframe #0 of the anchor carrier. "01" means that the NB-SIB1 is transmitted in subframe #4 of the anchor carrier. "10" means that the NB-SIB1 is transmitted in subframe #0 (in the condition that the cell ID is even) or subframe #5 (in the condition that the cell ID is odd) of the non-anchor carrier. The non-anchor carrier is higher than the anchor carrier by X. I.e. the center frequency of the non-anchor carrier—the center frequency of the anchor carrier=X (X is an absolute number of subcarriers (15 KHz) in this embodiment). "11" means that the NB-SIB1 is transmitted in subframe #0 (in the condition that the cell ID is even) or subframe #5 (in the condition that the cell ID is odd) of the non-anchor carrier. The non-anchor carrier is lower than the anchor carrier by X. I.e. the center frequency of the anchor carrier—the center frequency of the non-anchor carrier=X (X is an absolute number of subcarriers (15 KHz) in this embodiment).

Table 3 indicates the value of X. X is determined by an extra indication in the NB-MIB. "00" means that X=12 subcarriers (180 KHz). "01" means that X=13 subcarriers (195 KHz). "10" means that X=24 subcarriers (360 KHz). "11" is reserved.

Therefore, a total of four (4) bits is used for indication. For example, the indication 1000 means that the carrier is the non-anchor carrier that is 12 subcarriers (or 180 KHz) higher than the anchor carrier.

It can be seen that some combinations of 4 bits are not used as described above (in other words, they have the same meaning). For example, all of 0000, 0001, 0010 and 0011 may represent that the carrier is the anchor carrier and the subframe is 0.

Another solution is proposed in Table 4.

TABLE 4 another embodiment of non-anchor carrier indication for standalone operation mode

| Indication in MIB | Carrier | Carrier offset to anchor carrier | Subframe |
|---|---|---|---|
| 000 | anchor | / | 0 |
| 001 | anchor | / | 4 |
| 010 | Non-anchor | 12 subcarriers | 0 (PCell %2 = 0) 5 (PCell %2 = 1) |
| 011 | Non-anchor | −12 subcarriers | 0 (PCell %2 = 0) 5 (PCell %2 = 1) |
| 100 | Non-anchor | 13 subcarriers | 0 (PCell %2 = 0) 5 (PCell %2 = 1) |
| 101 | Non-anchor | −13 subcarriers | 0 (PCell %2 = 0) 5 (PCell %2 = 1) |
| 110 | Non-anchor | 24 subcarriers | 0 (PCell %2 = 0) 5 (PCell %2 = 1) |
| 111 | Non-anchor | −24 subcarriers | 0 (PCell %2 = 0) 5 (PCell %2 = 1) |

In the solution indicated in the Tables 2 and 3, the frequency offset of the non-anchor carrier to the anchor carrier is represented by (1) whether the non-anchor carrier has a higher or lower frequency than the anchor carrier and (2) an absolute frequency offset value of the non-anchor carrier to the anchor carrier. On the other hand, in the solution indicated in Table 4, the frequency offset of the non-anchor carrier to the anchor carrier is represented by a relative frequency offset, which may be a positive or a negative value. For example, as shown in Table 4, "010" represents that the non-anchor carrier is 12 subcarriers offset from the anchor carrier, i.e. the center frequency of the non-anchor carrier—the center frequency of the anchor carrier=12 subcarriers (a positive value). "011" represents that the non-anchor carrier is −12 subcarriers offset from the anchor carrier, i.e. the center frequency of the non-anchor carrier—the center frequency of the anchor carrier=−12 subcarriers (a negative value). Similarly, "100", "101", "110" and "111" represent that the non-anchor carrier is, respectively, 13 subcarriers, −13 subcarriers, 24 subcarriers and −24 subcarriers offset from the anchor carrier. Moreover, it can be seen that the relative frequency offset(s) of the non-anchor carrier to the anchor carrier, i.e. positive and negative values, are symmetrical to zero, e.g. 12 subcarriers and −12 subcarriers are symmetrical to zero, 13 subcarriers and −13 subcarriers are symmetrical to zero, and 24 subcarriers and −24 subcarriers are symmetrical to zero.

Figure 7:
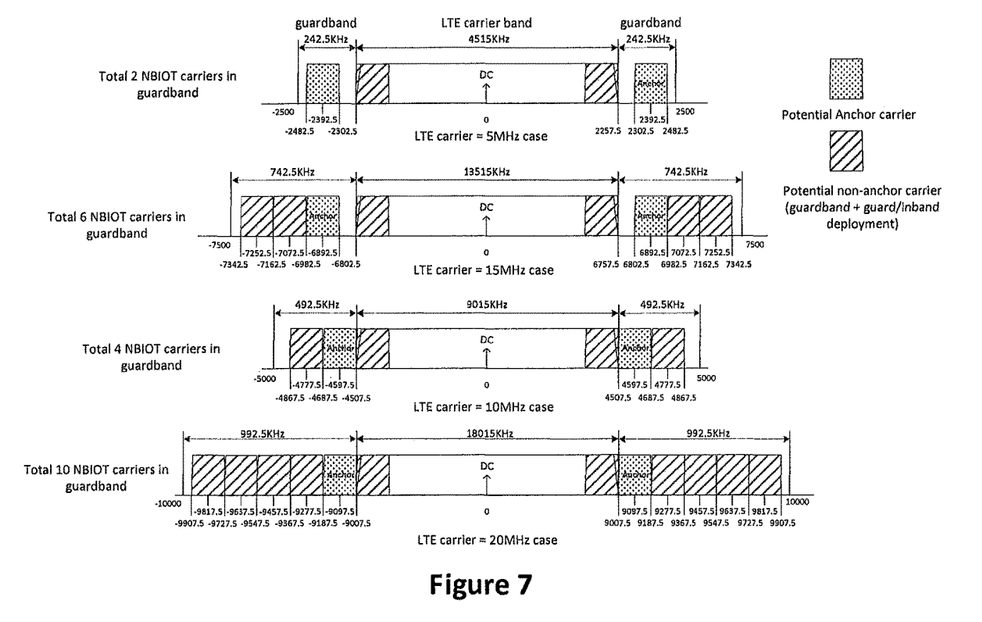
FIG. 7 depicts an example of NB-IoT anchor carrier deployment for a guard band.

FIG. 7 depicts an example of NB-IoT anchor carrier deployment for the guard band. The guard band NB-IoT deployment may be different for different operators/vendors. The band(s), especially the detailed numbers of the frequencies shown in FIG. 7, are only for examples.

As shown in FIG. 7, for 20 MHz and 10 MHz LTE system bandwidths, anchor carriers are potentially placed on the first PRB in the guard-band, counting from the edge of the in-band. In consideration of the 100 KHz channel raster requirement, there is only one potential anchor carrier available for each side of guard band.

The 100 KHz channel raster requirement means that the center frequency of the anchor carrier should be a multiple of 100 KHz. In the guard band operation mode, the center frequency of the anchor carrier CANNOT be exactly a multiple of 100 KHz. Instead, an offset of the center frequency of the anchor carrier from the channel raster of 100 KHz may be present. The offset is at most 7.5 KHz according to the NB-IoT standard. Practically, the offset is 2.5 KHz or 7.5 KHz.

As an example, for the 10 MHz LTE system bandwidth, there are two carriers in the guard band at each side of the in-band. The center frequencies are respectively 4597.5 KHz and 4777.5 KHz or −4597.5 KHz and −4777.5 KHz to LTE carrier center (e.g. assuming LTE carrier center is 0 Hz). Based on the above-described center frequency of the anchor carrier meeting the 100 KHz channel raster requirement in view of the maximum offset of 7.5 KHz, only the carriers with the center frequencies of 4597.5 KHz and −4597.5 KHz to LTE carrier center may be used as potential anchor carriers. The other two carriers with the center frequencies of 4777.5 KHz and −4777.5 KHz may be used as potential non-anchor carriers. Incidentally, the carriers inside the in-band may also be used as potential non-anchor carriers.

Similarly, for the 20 MHz LTE system bandwidth, only the carriers with center frequencies 9097.5 KHz and −9097.5 KHz are eligible as potential anchor carriers. The other eight carriers in the guard band may be used as potential non-anchor carriers.

For 15 MHz and 5 MHz LTE system bandwidths, in order to meet the requirement of 100 KHz channel raster requirement, 3 empty subcarriers (each has a bandwidth of 15 KHz) should be added between the in-band PRB grid and the guard-band PRB grid. There is only one potential anchor carrier available for each side of the guard band. For the 15 MHz LTE system bandwidth, the available potential anchor carriers have the center frequencies of 6892.5 KHz and −6892.5 KHz. For the 5 MHz LTE system bandwidth, the available potential anchor carriers have the center frequencies of 2392.5 KHz and −2392.5 KHz. The other carriers in the guard band are potential non-anchor carriers.

Figure 8:
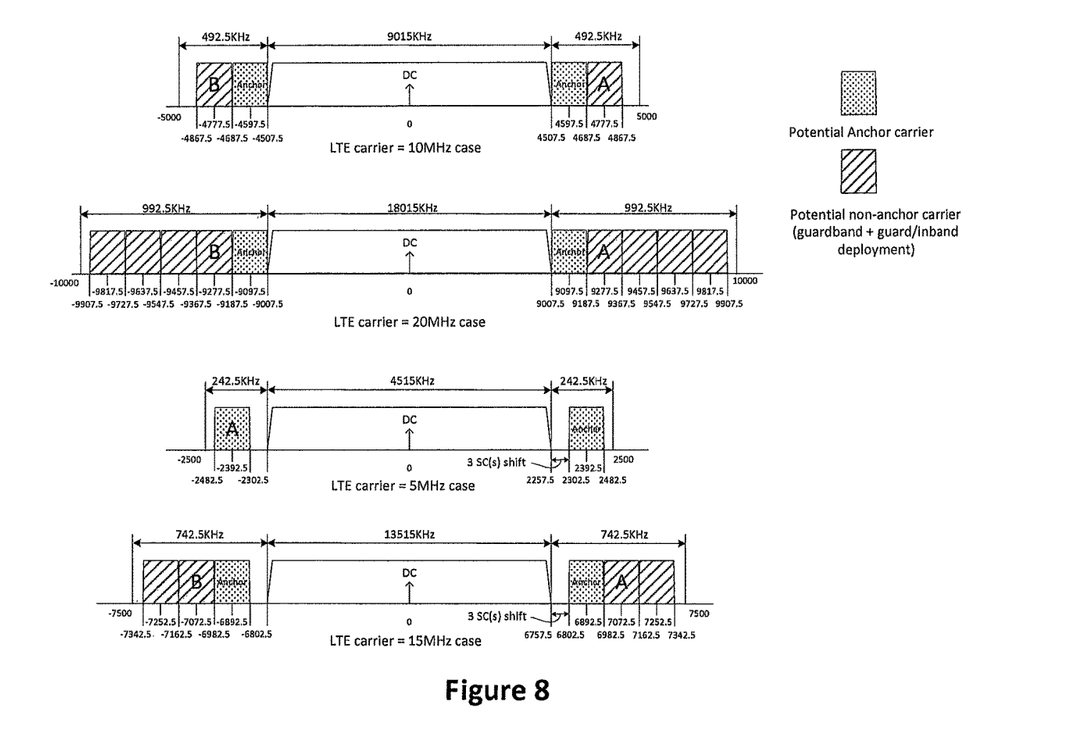
FIG. 8 is a schematic diagram illustrating one embodiment of non-anchor carrier frequency offset indication in a guard band operation mode.

FIG. 8 depicts one embodiment of non-anchor carrier frequency offset indication in the guard band operation mode, in which only the carriers, in the guard band are potential non-anchor carriers, which means that the deployment of NBIOT is guardband (anchor carrier)+guardband (non-anchor carrier).

In the guard band operation mode, the LTE carrier bandwidth, the anchor carrier offset to LTE carrier, the non-anchor carrier offset and the frequency offset of the non-anchor carrier to the anchor carrier are to be indicated.

Two bits are used for the LTE carrier bandwidth, i.e. 5 MHz, 10 MHz, 15 MHz and 20 MHz. Table 5 shows the detailed implementation.

TABLE 5

LTE carrier bandwidth

| Extra Indication in MIB | LTE carrier bandwidth |
|---|---|
| 00 | 5 MHz |
| 01 | 10 MHz |
| 10 | 15 MHz |
| 11 | 20 MHz |

One bit is used to indicate the anchor carrier offset relative to the LTE carrier. Table 6 shows the detailed implementation.

TABLE 6 offset of the anchor carrier to the LTE carrier

| Extra Indication in MIB | Anchor carrier to LTE carrier |
|---|---|
| 0 | Higher/right guard band |
| 1 | Lower/left guard band |

For example, for the 10 MHz LTE system bandwidth, the anchor carrier with the center frequency 4597.5 KHz is located in the higher/right guard band, while the anchor carrier with the center frequency −4597.5 KHz is located in the lower/left guard band.

To be compatible with the in-band operation mode, two bits are used to indicate the non-anchor carrier offset. Table 7 shows the detailed implementation.

TABLE 7 non-anchor carrier indication for guard band operation mode

| Indication in MIB | Carrier | Subframe |
|---|---|---|
| 00 | anchor | 0 |
| 01 | anchor | 4 |
| 10 | Non-anchor higher frequency band to anchor carrier | 0 (PCell %2 = 0) 5 (PCell %2 = 1) |
| 11 | Non-anchor lower frequency band to anchor carrier | 0 (PCell %2 = 0) 5 (PCell %2 = 1) |

In Table 7, "00" means that the NB-SIB1 is transmitted in subframe #0 of the anchor carrier. "01" means that the NB-SIB1 is transmitted in subframe #4 of the anchor carrier. "10" means that the NB-SIB1 is transmitted in subframe #0 (in the condition that the cell ID is even) or subframe #5 (in the condition that the cell ID is odd) of the non-anchor carrier. "11" means that the NB-SIB1 is transmitted in subframe #0 (in the condition that the cell ID is even) or subframe #5 (in the condition that the cell ID is odd) of the non-anchor carrier.

As shown in FIG. 8, only the carrier close to the anchor carrier, i.e. those carriers labeled as A or B, is chosen as the non-anchor carrier. Therefore, in the condition that the non-anchor carrier being higher or lower than the anchor carrier is determined, the frequency offset of the non-anchor carrier to the anchor carrier is fixed. Therefore, the frequency offset of the non-anchor carrier to the anchor carrier depends on the bandwidth information of the LTE carrier.

Table 8 is the combination of Tables 5-7.

TABLE 8 non-anchor carrier indication for guard band operation mode

| Indication in MIB | X Non-anchor carrier to anchor carrier | Comments |
|---|---|---|
| 00 0 10 | invalid | 5 MHz, higher guard band |
| 00 0 11 | −4785 KHz (−2392.5 − 2392.5) | |
| 00 1 10 | 4785 KHz (2392.5 + 2392.5) | 5 MHz, lower guard band |
| 00 1 11 | invalid | |
| 01 0 10 | 180 KHz | 10 MHz, higher guard band |
| 01 0 11 | −9375 KHz (−4777.5 − 4597.5) | |
| 01 1 10 | 9375 KHz (4777.5 + 4597.5) | 10 MHz, lower guard band |
| 01 1 11 | −180 KHz | |
| . . . | . . . | |

For example, according to Table 8, "01 0 10" represents that, in the 10 MHz bandwidth, the non-anchor carrier is 180 KHz higher than anchor carrier. In particular, "01" means that the LTE carrier bandwidth is 10 MHz (see Table 5). "0" means that the anchor carrier is higher than the LTE carrier (see Table 6), which implies that the anchor carrier has a center frequency 4597.5 KHz (see FIG. 8). "10" means that the non-anchor carrier is higher than the anchor carrier. By referring to FIG. 8, there is only one choice of the non-anchor carrier with a center frequency 4777.5 KHz. Therefore, the offset of the non-anchor carrier to the anchor carrier is definitely 180 KHz (4777.5-4597.5), assuming that the center of LTE carrier is 0 Hz.

In the 5 MHz and 15 MHz system bandwidths, there is a three-subcarrier shift of the anchor carrier from the LTE carrier bandwidth to meet the requirement of 100 KHz channel raster.

Another solution is also proposed in the guard band operation mode. In which the deployment of NBIOT is guardband (anchor carrier)+guardband (non-anchor carrier) or guardband (anchor carrier)+inband (non-anchor carrier). Tables 9 and 10 provide the implementation.

TABLE 9

LTE carrier bandwidth

| Extra Indication in MIB | LTE carrier bandwidth |
|---|---|
| 00 | 5 MHz |
| 01 | 10 MHz |
| 10 | 15 MHz |
| 11 | 20 MHz |

TABLE 10 another embodiment of non-anchor carrier indication for guard band operation mode

| Indication in MIB | Carrier | Carrier offset to anchor carrier | Subframe |
|---|---|---|---|
| 000 | anchor | / | 0 |
| 001 | anchor | / | 4 |
| 010 | Non-anchor | XKHz | 0 (PCell %2 = 0)<br>5 (PCell %2 = 1) |
| 011 | Non-anchor | −XKHz | 0 (PCell %2 = 0)<br>5 (PCell %2 = 1) |
| 100 | Non-anchor | YKHz | 0 (PCell %2 = 0)<br>5 (PCell %2 = 1) |
| 101 | Non-anchor | −YKHz | 0 (PCell %2 = 0)<br>5 (PCell %2 = 1) |
| 110 | reserved | reserved | reserved |
| 111 | reserved | reserved | reserved |

Table 11 is a combination of Tables 9 and 10.

TABLE 11 another embodiment of non-anchor carrier indication for guard band operation mode

| LTE carrier bandwidth | X | Y |
|---|---|---|
| 5 MHz | / | 4785 |
| 10 MHz | 180 | 9375 |
| 15 MHz | 180 | 13965 |
| 20 MHz | 180 | 18375 |

Table 11 provides the default offset of the non-anchor carrier to the anchor carrier. By referring to FIG. 8, in the condition of 5 MHz LTE system bandwidth, when the band with the center frequency 2392.5 KHz is the anchor carrier, the band with the center frequency −2392.5 KHz (Y=2392.5+2392.5=4.785) will be configured as the non-anchor carrier. In the condition of 10 MHz LTE system bandwidth, when the band with the center frequency 4597.5 KHz is the anchor carrier, the band with the center frequency 4777.5 KHz (X=4777.5−4597.5=180) or the band with the center frequency −4777.5 KHz (Y=4597.5+4777.5=9375) will be configured as the non-anchor carrier. X and Y can be similarly determined for the 15 MHz and 20 MHz LTE system bandwidths.

Figure 9:
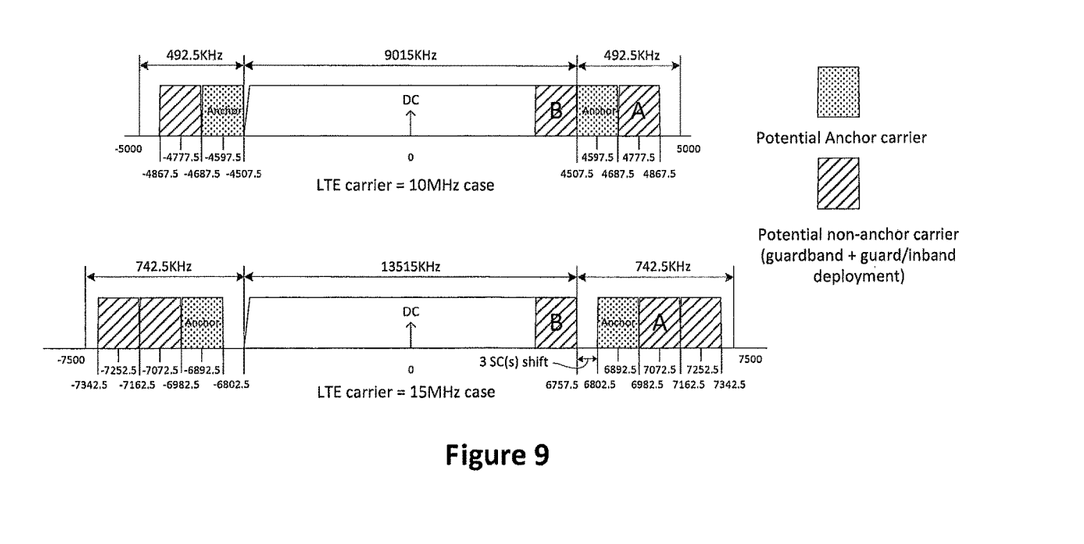
FIG. 9 is a schematic diagram illustrating another embodiment of non-anchor carrier frequency offset indication in the guard band operation mode.

FIG. 9 depicts another embodiment of non-anchor carrier frequency offset indication in the guard band operation mode. In the embodiment of FIG. 8, in the condition that the anchor carrier is located in the guard band, the non-anchor band is also located in the guard band. FIG. 9 shows that the non-anchor carrier may be located in the guard band or in the in-band.

In said another embodiment, the LTE carrier bandwidth, the anchor carrier offset to LTE carrier, the non-anchor carrier offset and the frequency offset of the non-anchor carrier to the anchor carrier are to be indicated.

One bit is used for the LTE carrier bandwidth, i.e. 5 MHz/15 MHz and 10 MHz/2 MHz. Table 12 shows the detailed implementation.

TABLE 12

LTE carrier bandwidth

| Extra Indication in MIB | LTE carrier bandwidth |
|---|---|
| 0 | 5/15 MHz |
| 1 | 10/20 MHZ |

One bit is used to indicate the anchor carrier offset relative to the LTE carrier. Table 13 shows the detailed implementation.

TABLE 13 offset of the anchor carrier to the LTE carrier

| Extra Indication in MIB | Anchor carrier to LTE carrier |
|---|---|
| 0 | Higher/right guard band |
| 1 | Lower/left guard band |

To be compatible with the in-band operation mode, two bits are used to indicate the non-anchor carrier offset. Table 14 shows the detailed implementation.

TABLE 14 non-anchor carrier indication for guard band operation mode

| Indication in MIB | Carrier | Subframe |
|---|---|---|
| 00 | anchor | 0 |
| 01 | anchor | 4 |
| 10 | Non-anchor higher frequency band to anchor carrier | 0 (PCell %2 = 0)<br>5 (PCell %2 = 1) |
| 11 | Non-anchor lower frequency band to anchor carrier | 0 (PCell %2 = 0)<br>5 (PCell %2 = 1) |

As shown in FIG. 9, only the carrier adjacent to the anchor carrier, e.g. the carriers labeled as A or B, may be chosen as the non-anchor carrier. Therefore, in the condition that the relative offset (higher or lower) of the non-anchor carrier to the anchor carrier is determined, the offset of the non-anchor carrier to the anchor carrier is fixed.

Table 15 is the combination of Tables 12-14.

TABLE 15 non-anchor carrier indication for guard band operation mode

| Indication in MIB | X Non-anchor carrier to anchor carrier | Comments |
|---|---|---|
| 0 0 10 | 180 KHz | 5/15 MHz, higher guard band |
| 0 0 11 | −225 KHz | |
| 0 1 10 | 225 KHz | 5/15 MHz, lower guard band |
| 0 1 11 | −180 KHz | |
| 1 0 10 | 180 KHz | 10/20 MHz, higher guard band |
| 1 0 11 | −180 KHz | |
| 1 1 10 | 180 KHz | 10/20 MHz, lower guard band |
| 1 1 11 | −180 KHz | |

For example, according to Table 15, "0 0 10" represents that, in the 5/15 MHz bandwidth, the non-anchor carrier is 180 KHz higher than anchor carrier. The first "0" means 5/15 MHz (see Table 12). The second "0" means that the anchor carrier is higher than the LTE carrier (see Table 13). The "10" means that the non-anchor carrier is higher than the anchor carrier (7072.5−6892.5=180 KHz).

Another solution is also proposed in the guard band operation mode. Tables 16 and 17 provide the implementation.

TABLE 16

LTE carrier bandwidth

| Extra Indication in MIB | LTE carrier bandwidth |
|---|---|
| 0 | 5/15 MHz |
| 1 | 10/20 MHz |

TABLE 17 another embodiment of non-anchor carrier indication for guard band operation mode

| Indication in MIB | Carrier | Carrier offset to anchor carrier | Subframe |
|---|---|---|---|
| 000 | anchor | / | 0 |
| 001 | anchor | / | 4 |
| 010 | Non-anchor | XKHz | 0 (PCell %2 = 0) 5 (PCell %2 = 1) |
| 011 | Non-anchor | −XKHz | 0 (PCell %2 = 0) 5 (PCell %2 = 1) |
| 100 | Non-anchor | YKHz | 0 (PCell %2 = 0) 5 (PCell %2 = 1) |
| 101 | Non-anchor | −YKHz | 0 (PCell %2 = 0) 5 (PCell %2 = 1) |
| 110 | reserved | reserved | reserved |
| 111 | reserved | reserved | reserved |

Table 18 is a combination of Tables 16 and 17.

TABLE 18 another embodiment of non-anchor carrier indication for guard band operation mode

| LTE carrier bandwidth | X | Y |
|---|---|---|
| 5/15 MHz | 180 | 225 |
| 10/20 MHz | 180 | 180 |

By referring to FIG. 9, since there is a three-subcarrier shift of the anchor carrier from the LTE carrier in 5/15 MHz bandwidths to meet the requirement of 100 KHz channel raster, the band B as the non-anchor carrier has a 225 KHz shift from the anchor carrier. On the other hand, for the LTE carrier 10/20 MHz bandwidths, since there is no shift of the anchor carrier, both bands A and B have a 180 KHz shift from the anchor carrier.

Table 19 is a summary of the embodiments.

TABLE 19 summary of the embodiments

| Operation mode | Indication bit in MIB | Comments | Total bit |
|---|---|---|---|
| In-band | Anchor/non-anchor | 1 bit | 2 |
| | Subframe (anchor) | 1 bit | |
| | Higher/lower adjacent carrier(non anchor) | | |
| Standalone | Anchor/non-anchor | 1 bit | <7 |
| | Subframe (anchor) | 1 bit | |
| | Higher/lower carrier(non anchor) | | |
| | Carrier offset to anchor carrier | <5 (use MIB extra spare 5 bit) | |
| Guard band | Anchor/non-anchor | 1 bit | 4 or 5 |
| | Subframe (anchor) | 1 bit | |
| | Higher/lower carrier(non anchor) | | |
| | Anchor carrier frequency offset to LTE carrier | 1 bit (use MIB extra spare 3 bit) | |
| | LTE carrier bandwidth | 1 bit or 2 bit (use MIB extra spare 3 bit) | |

As shown in Table 19, in the in-band operation mode, a total of two bits are used for indication of the non-anchor carrier. In the standalone operation mode, up to seven bits may be used for indication of the non-anchor carrier, in which up to five spare bits may be used for indicating the frequency offset of the non-anchor carrier to the anchor carrier. In the guard band operation mode, a total of four or five bits are used for indication of the non-anchor carrier, in which up to three spare bits may be used for indicating the LTE bandwidth and the offset of the anchor carrier to the LTE carrier.

Figure 10:
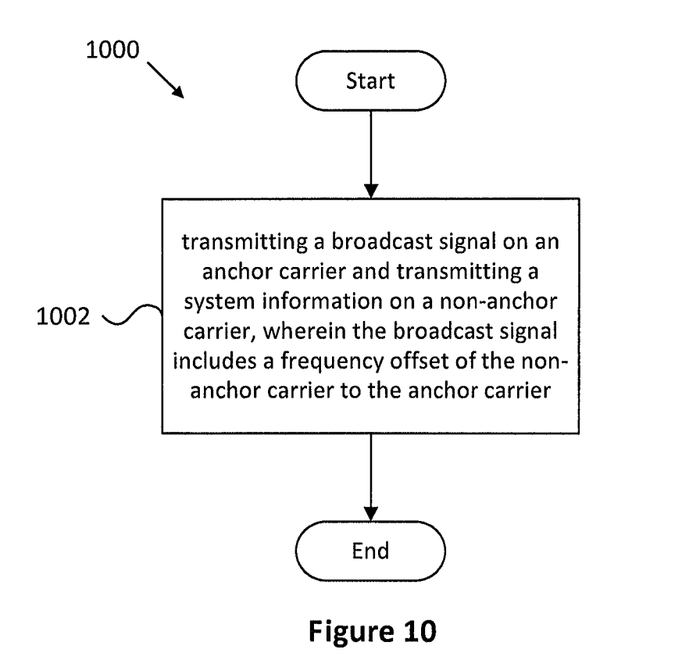
FIG. 10 is a schematic flow chart diagram illustrating an embodiment of a method for indicating the frequency offset of the non-anchor carrier.

FIG. 10 is a schematic flow chart diagram illustrating an embodiment of a method 1000 for indicating the frequency offset of the non-anchor carrier. In some embodiments, the method 1000 is performed by an apparatus, such as the base unit 104. In certain embodiments, the method 1000 may be performed by a processor executing program code, for example, a microcontroller, a microprocessor, a CPU, a GPU, an auxiliary processing unit, a FPGA, or the like.

The method 1000 may include 1002 transmitting a broadcast signal on an anchor carrier and transmitting a system information on a non-anchor carrier, wherein the broadcast signal includes a frequency offset of the non-anchor carrier to the anchor carrier.

In various embodiments, the frequency offset of the non-anchor carrier to the anchor carrier includes an information of the non-anchor carrier having a higher or lower frequency than the anchor carrier and an absolute frequency offset value of the non-anchor carrier to the anchor carrier or some combination thereof. In another embodiment, the frequency offset of the non-anchor carrier to the anchor carrier includes a relative frequency offset of the non-anchor carrier to the anchor carrier. The relative frequency offset of the non-anchor carrier to the anchor carrier may be symmetrical to zero. In some embodiment, the anchor carrier is in a guard band frequency of a LTE carrier, and the broadcast signal further includes bandwidth information of the LTE carrier. The broadcast signal may further include a frequency offset of the anchor carrier to the LTE carrier. The frequency offset of the non-anchor carrier to the anchor carrier may depend on the bandwidth information of the LTE carrier. In some embodiment, the non-anchor carrier is adjacent to the anchor carrier.

Figure 11:
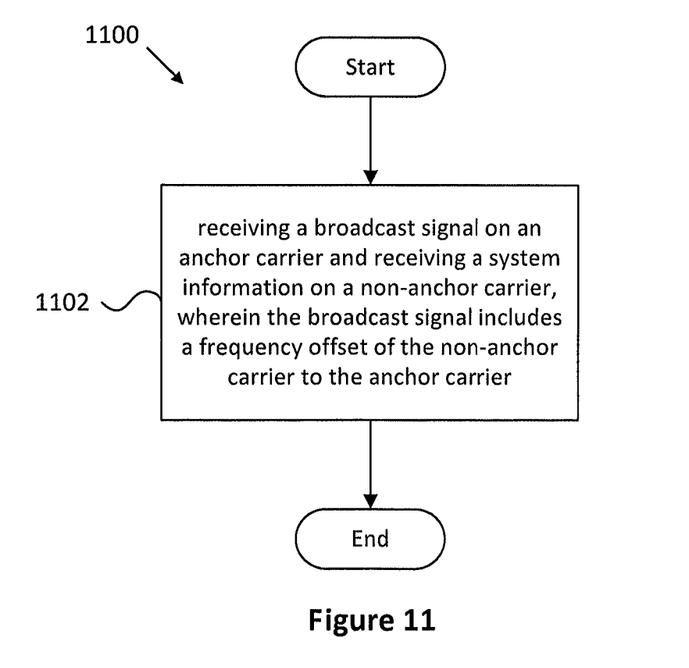
FIG. 11 is a schematic flow chart diagram illustrating a further embodiment of a method for indicating the frequency offset of the non-anchor carrier.

FIG. 11 is a schematic flow chart diagram illustrating a further embodiment of a method 1100 for indicating the frequency offset of the non-anchor carrier. In some embodiments, the method 1100 is performed by an apparatus, such as the remote unit 104. In certain embodiments, the method 1100 may be performed by a processor executing program code, for example, a microcontroller, a microprocessor, a CPU, a GPU, an auxiliary processing unit, a FPGA, or the like.

The method 1100 may include 1102 receiving a broadcast signal on an anchor carrier and receiving system information on a non-anchor carrier, wherein the broadcast signal includes a frequency offset of the non-anchor carrier to the anchor carrier.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:
    transmitting a broadcast signal on an anchor carrier, wherein the anchor carrier is within a guard band associated with a Long-Term Evolution (LTE) carrier, and the broadcast signal includes bandwidth information of the LTE carrier that includes an LTE carrier bandwidth selected from the group comprising 5 MHz, 10 MHz, 15 MHz, and 20 MHz; and
    transmitting a system information on a non-anchor carrier, wherein the non-anchor carrier is within the guard band associated with the LTE carrier, and the broadcast signal indicates:
        a frequency offset between the anchor carrier and the LTE carrier; and
        a frequency offset between the non-anchor carrier and the anchor carrier, wherein the frequency offset between the non-anchor carrier and the anchor carrier indicates the non-anchor carrier is located on the same side of the guard band associated with the LTE carrier with the anchor carrier or the non-anchor carrier is located on the opposite side of the guard band associated with the LTE carrier to the anchor carrier.

2. The method of claim 1, wherein the frequency offset of the non-anchor carrier to the anchor carrier includes:
    an information of the non-anchor carrier having a higher or lower frequency than the anchor carrier; and
    an absolute frequency offset value of the non-anchor carrier to the anchor carrier or some combination thereof.

3. The method of claim 1, wherein the frequency offset of the non-anchor carrier to the anchor carrier includes a relative frequency offset of the non-anchor carrier to the anchor carrier.

4. The method of claim 1, wherein the frequency offset of the non-anchor carrier to the anchor carrier depends on the bandwidth information of the LTE carrier.

5. The method of claim 1, wherein the non-anchor carrier is adjacent to the anchor carrier.

6. A base station, comprising:
    at least one memory; and
    at least one processor coupled with the at least one memory and configured to cause the base station to:
        transmit a broadcast signal on an anchor carrier, wherein the anchor carrier is within a guard band associated with a Long-Term Evolution (LTE) carrier, and the broadcast signal includes bandwidth information of the LTE carrier that includes an LTE carrier bandwidth selected from the group comprising 5 MHz, 10 MHz, 15 MHz, and 20 MHz; and
        transmit a system information on a non-anchor carrier, wherein the non-anchor carrier is within the guard band associated with the LTE carrier, and the broadcast signal indicates:
            a frequency offset between the anchor carrier and the LTE carrier; and
            a frequency offset between the non-anchor carrier and the anchor carrier, wherein the frequency offset between the non-anchor carrier and the anchor carrier indicates the non-anchor carrier is located on the same side of the guard band associated with the LTE carrier with the anchor carrier or the non-anchor carrier is located on the opposite side of the guard band associated with the LTE carrier to the anchor carrier.

7. The base station of claim 6, wherein the frequency offset of the non-anchor carrier to the anchor carrier includes:
    an information of the non-anchor carrier having a higher or lower frequency than the anchor carrier; and
    an absolute frequency offset value of the non-anchor carrier to the anchor carrier or some combination thereof.

8. The base station of claim 6, wherein the frequency offset of the non-anchor carrier to the anchor carrier includes a relative frequency offset of the non-anchor carrier to the anchor carrier.

9. The base station of claim 6, wherein the frequency offset of the non-anchor carrier to the anchor carrier depends on the bandwidth information of the LTE carrier.

10. The base station of claim 6, wherein the non-anchor carrier is adjacent to the anchor carrier.

11. A method performed by a user equipment (UE), the method comprising:
    receiving a broadcast signal on an anchor carrier; and
    receiving a system information on a non-anchor carrier, wherein the anchor carrier is within a guard band associated with a Long-Term Evolution (LTE) carrier that includes an LTE carrier bandwidth selected from the group comprising 5 MHz, 10 MHz, 15 MHz, and 20

MHz, and the broadcast signal includes bandwidth information of the LTE carrier, the non-anchor carrier is within the guard band associated with the LTE carrier, and the broadcast signal indicates:
- a frequency offset between the anchor carrier and the LTE carrier; and
- a frequency offset between the non-anchor carrier and the anchor carrier, wherein the frequency offset between the non-anchor carrier and the anchor carrier indicates the non-anchor carrier is located on the same side of the guard band associated with the LTE carrier with the anchor carrier or the non-anchor carrier is located on the opposite side of the guard band associated with the LTE carrier to the anchor carrier.

12. The method of claim 11, wherein the frequency offset of the non-anchor carrier to the anchor carrier includes an information of the non-anchor carrier having a higher or lower frequency than the anchor carrier and an absolute frequency offset value of the non-anchor carrier to the anchor carrier or some combination thereof.

13. The method of claim 11, wherein the frequency offset of the non-anchor carrier to the anchor carrier includes a relative frequency offset of the non-anchor carrier to the anchor carrier.

14. The method of claim 11, wherein the frequency offset of the non-anchor carrier to the anchor carrier depends on the bandwidth information of the LTE carrier.

15. The method of claim 11, wherein the non-anchor carrier is adjacent to the anchor carrier.

16. A user equipment (UE), comprising:
- at least one memory; and
- at least one processor coupled with the at least one memory and configured to cause the UE to:
  - receive a broadcast signal on an anchor carrier, wherein the anchor carrier is within a guard band associated with a Long-Term Evolution (LTE) carrier, and the broadcast signal includes bandwidth information of the LTE carrier that includes an LTE carrier bandwidth selected from the group comprising 5 MHz, 10 MHz, 15 MHz, and 20 MHz; and
  - receive a system information on a non-anchor carrier, wherein the non-anchor carrier is within the guard band associated with the LTE carrier, and the broadcast signal indicates:
    - a frequency offset between the anchor carrier and the LTE carrier; and
    - a frequency offset between the non-anchor carrier and the anchor carrier, wherein the frequency offset between the non-anchor carrier and the anchor carrier indicates the non-anchor carrier is located on the same side of the guard band associated with the LTE carrier with the anchor carrier or the non-anchor carrier is located on the opposite side of the guard band associated with the LTE carrier to the anchor carrier.

17. The UE of claim 16, wherein the frequency offset of the non-anchor carrier to the anchor carrier includes an information of the non-anchor carrier having a higher or lower frequency than the anchor carrier and an absolute frequency offset value of the non-anchor carrier to the anchor carrier or some combination thereof.

18. The UE of claim 16, wherein the frequency offset of the non-anchor carrier to the anchor carrier includes a relative frequency offset of the non-anchor carrier to the anchor carrier.

19. The UE of claim 16, wherein the frequency offset of the non-anchor carrier to the anchor carrier depends on the bandwidth information of the LTE carrier.

20. The UE of claim 16, wherein the non-anchor carrier is adjacent to the anchor carrier.

* * * * *